April 30, 1963   M. FAVRET   3,087,300
SELF-WINDING WATCH AND LIKE DEVICE
Filed Jan. 28, 1959   8 Sheets-Sheet 1

INVENTOR
MAXIME FAVRET

BY Mason, Porter, Diller & Stewart,
ATTORNEYS

April 30, 1963　　　M. FAVRET　　　3,087,300
SELF-WINDING WATCH AND LIKE DEVICE
Filed Jan. 28, 1959　　　　　　　　　　　　8 Sheets-Sheet 3

FIG. 3

INVENTOR
MAXIME FAVRET

BY Mason, Porter, Diller & Stewart,
ATTORNEYS

FIG. 5

April 30, 1963 M. FAVRET 3,087,300
SELF-WINDING WATCH AND LIKE DEVICE
Filed Jan. 28, 1959 8 Sheets-Sheet 6

INVENTOR
MAXIME FAVRET
BY Mason, Porter, Diller & Stewart,
ATTORNEYS

April 30, 1963    M. FAVRET    3,087,300
SELF-WINDING WATCH AND LIKE DEVICE
Filed Jan. 28, 1959    8 Sheets-Sheet 7

INVENTOR
MAXIME FAVRET
BY Mason, Porter, Diller & Stewart,
ATTORNEYS

United States Patent Office 3,087,300
Patented Apr. 30, 1963

3,087,300
SELF-WINDING WATCH AND LIKE DEVICE
Maxime Favret, Elgin, Ill., assignor to Elgin National Watch Company, Elgin, Ill., a corporation of Illinois
Filed Jan. 28, 1959, Ser. No. 789,674
4 Claims. (Cl. 58—82)

This invention relates to self-winding watches and like devices in which the random movements of one element are totalized as a continued unidirectional movement of a second element such as the main spring structure of a watch.

An object of the invention is the provision of a device, in which a pillar plate provides independent support for the winding mass and for the timing train elements.

Another object is the provision of a device including a pillar plate with bridges thereon for supporting a spring barrel and a balance wheel, together with a central structure supported from the pillar plate at a level below the tops of the barrel and balance wheel, and a movable mass journalled on said central structure.

Another object is the provision of a device including a pillar plate with bridges thereon for supporting a spring barrel and a balance wheel, together with a part extending across the movement center and supporting a stud positioned at said center and having its lower end below the level of the spring barrel and balance wheel, a rotor element rotatable on the stud and a movable mass connected to said element, clutch parts associated with the rotor, and means selectively driven through the clutch parts for winding the main spring.

A further object is the provision of a self-winding watch structure having a rotatable mass, a rotor connected to be driven thereby, and movement transmitting parts mounted on the rotor and held against separation therefrom, said parts including gears and constituting a removable sub-assembly with the rotor, a main spring and means driven by said gears to wind the main spring.

Illustrative embodiments of the invention are set out in the accompanying drawings, in which.

Figure 1:
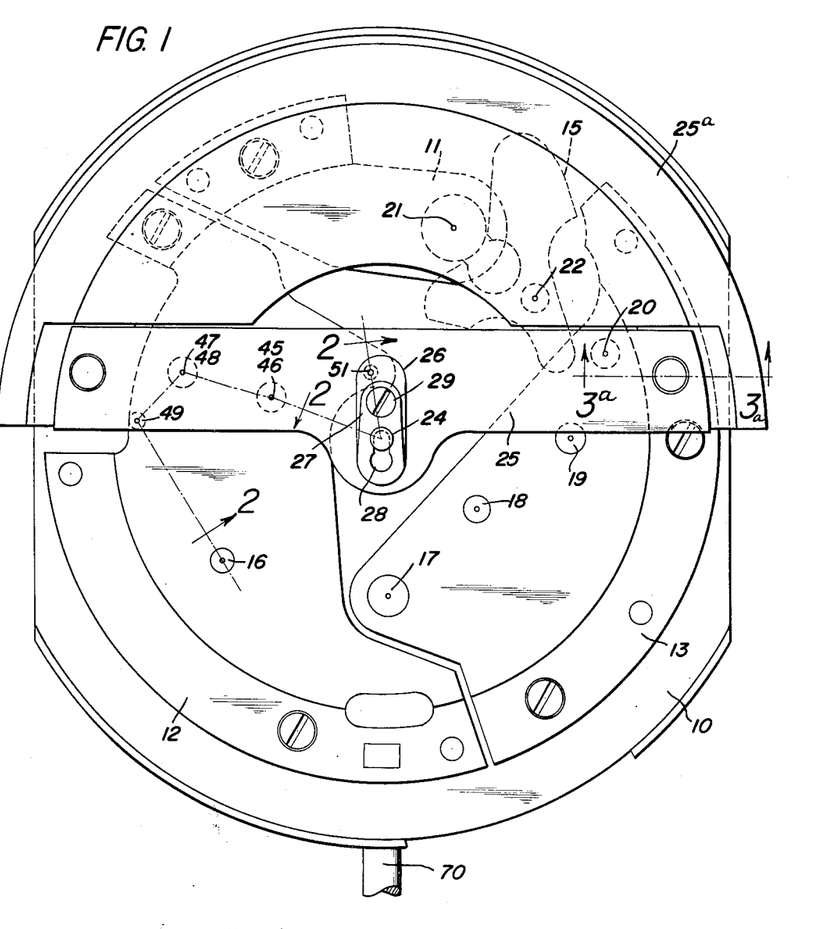
FIG. 1 is a plan view of the rear of a watch movement embodying the invention with the positions of axes of train and other parts indicated with certain parts behind the pendulum mass being shown by dotted lines.

In these drawings, FIGS. 1-9, a watch movement is shown with a pillar plate 10, a balance cock 11, a barrel bridge 12, a train bridge 13, a center bridge plate 14 (FIGS. 2 and 3), and a pallet bridge 15, connected rigidly together in ways known in the art. A spring barrel 16 is connected for driving a train including a second wheel 17, a third wheel 18, a fourth wheel 19 and an escape wheel 20, all of which are provided with staffs and pinions as usual and are mounted in the pillar plate and bridges. The illustrative spring barrel 16 is of usual form and mounted in the pillar plate 10 and the barrel bridge 12 as usual, and has the usual winding gear 50 on the spring arbor. The balance wheel 21 and the pallet 22 are mounted in the pillar plate 10, balance cock 11 and pallet bridge 15. The hair spring HS is connected for oscillating the balance wheel 21. The drawings have been conventionalized, omitting the showings of steady pins, bearings and other parts common in watch construction but not requiring illustration in specific form for this disclosure. In FIG. 1, the axis centers are shown by the same numerals as the respective wheels, etc.

According to the illustrative forms of the invention, the bridge plate 14 extends across the movement center, that is, the axis of the hand staffs and the other bridges leave a space at this center, above (FIGS. 1, 2, and 5) the center bridge plate 14. A stud 23 is rigidly secured to the bridge plate 14 at the movement center. This stud 23 has a reduced neck 23b near its upper end and an enlarged head 24 which can pass through a central aperture in the sweep arm 25. The sweep arm 25 has a trough 26 at its upper surface for receiving a sliding lock piece 27 with a keyhole aperture 28 (FIG. 1) which at its larger part will pass the head 24 and at its smaller part engages around the stud neck and beneath the head for holding the sweep arm 25 against removal from the stud. The piece 27 can be fixed in position by a screw 29 which engages in the sweep arm 25. This sweep arm 25 is shown as a diametrically extending element, connected at its ends to the movable weight 25a which can have a deep section at its periphery (FIG. 3a) to give an appropriate mass for the torsion effect to wind the main spring, and therewith extending below the level of the various bridges. This sweep arm 25 and the weight 25a provide a pendulum which moves upon change of position of the plate and bridge assembly and therewith delivers the energy for winding the mainspring.

A sleeve 30 (FIG. 2) is freely rotatable about the body of the stud 23 and has (FIG. 5) a lower flange 31 against which rotatably rests the toothed lower ring 32. The sleeve 30 (FIGS. 6 and 7) has a cylindrical shape for the major part of its periphery, and has at least one non-round portion, of which two are shown as diametrically opposite chordal flats 43. A first driving ring 33a rests against the lower toothed ring 32 and has (FIG. 6) a central aperture which loosely receives the sleeve 30 and has two chordal surfaces 43a for engagement with the portions 43 of the sleeve so that it is rotated with the sleeve. Rollers 42a have their axes parallel to the axes of sleeve 30 and stud 23 and rest against the driving ring 33a and are located in notches of a lower driving ring 34, three such identical notches being shown in FIG. 6 with radial walls 40a and inwardly spiralling walls 41a; whereby the three rollers 42a can be wedged between the spiral walls 41a and the outer surface of the sleeve 30 for driving the ring 34, or can rest against the radial walls 40a and therewith release the ring 34 so that it is not driven by the sleeve 30. Between the notches, the ring 34 has inward projections 34a which conform to the cylindrical part of the sleeve 30 for guidance thereby. The ring 34 has (FIG. 5) an axial flange 34b at its periphery which is force-fitted to the lower toothed ring 32 and moves with it.

A second driving ring 33b rests (FIGS. 5 and 6) against the rollers 42a and the lower driving ring 34; and likewise is loosely conformed (FIG. 7) to the sleeve 30 with chordal walls 43b for driving engagement with the portions 43. This ring 33b is shown partly broken away in FIG. 6, to reveal underlying rollers 42a and their notches 40a, 41a. A toothed upper driving ring 36 has at its inner periphery illustratively three notches (FIG. 7) with radial walls 40b and spiral walls 41b; these notches receive rollers 42b, likewise with their axes parallel to the axis of sleeve 30; and it will be noted (FIGS. 6 and 7) that the spiral walls 41b and 41a are oppositely pitched. Between the notches, the ring 36 has inwardly extending projections 36a for guided engagement with the sleeve 30, and it will be noted that the peripheral arc of each of these projections 36a, like the projections 34a, is greater than the arc subtended by the chordal walls 43b.

A top driving ring 33c (FIG. 5) rests against the rollers 42b, and is confined by the arm 25 so that it acts as a detainer for preventing escape of these rollers. The driving ring 33c also is guided by the sleeve 30 and has chordal walls for engagement with the portions 43.

Figure 5:
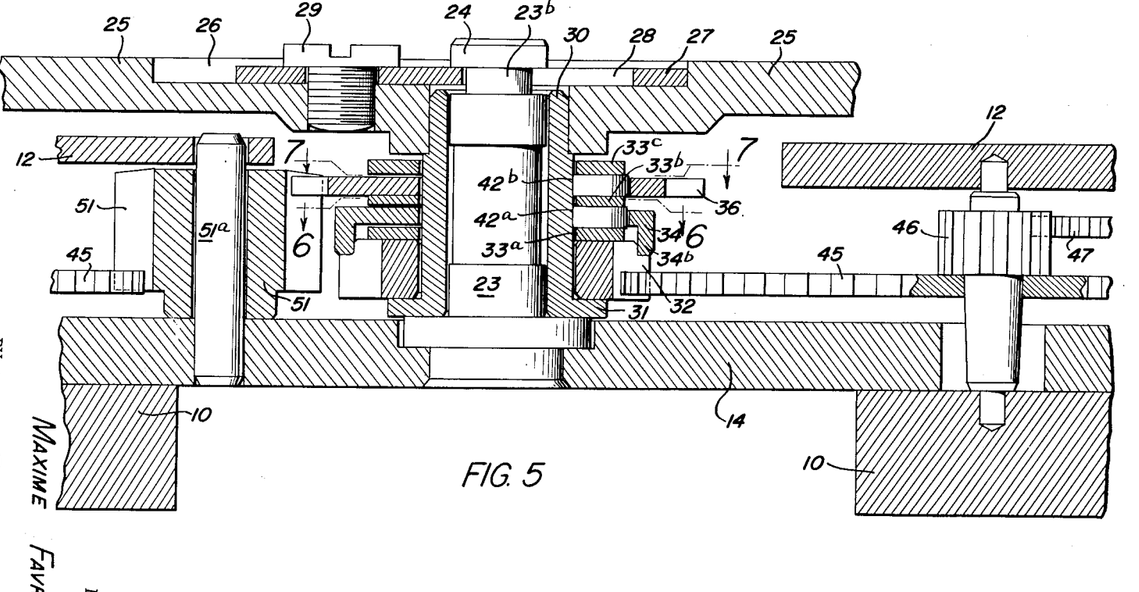
FIG. 5 is an axial section, on a larger scale, of parts of the winding system located at the movement center.

As shown in FIG. 5, the rollers 42a and 42b are thicker than the respective driven rings 34, 36 in whose notches they are present: so that the driving rings 33a, 33b and driving ring 33c bear upon the end surfaces of the rollers and cause them to move with these driving rings until the rollers wedge and produce the drive, or are freed and brought against the radial notch walls.

When the sweep arm 25 moves, it turns the sleeve 30 through a like angle about its axis, and therewith the rings 33a, 33b, 33c are turned. When these parts move clockwise, as shown by the arrow in FIG. 6, the sleeve 30 and its rings move the rollers 42a into engagement with the spiral walls 41a so that these rollers provide a driving engagement for rotating the lower driving ring 34 with the sleeve 30; while the sleeve 30 and rings act (FIG. 7) to move the rollers 42b along the spiral walls 41b from parts of lesser radius toward the radial walls 40b at which the rollers 42b do not provide a driving effect from the sleeve 30 to the upper ring 36, so that the sleeve 30 and ring 36 can rotate relative to one another.

Figure 6:
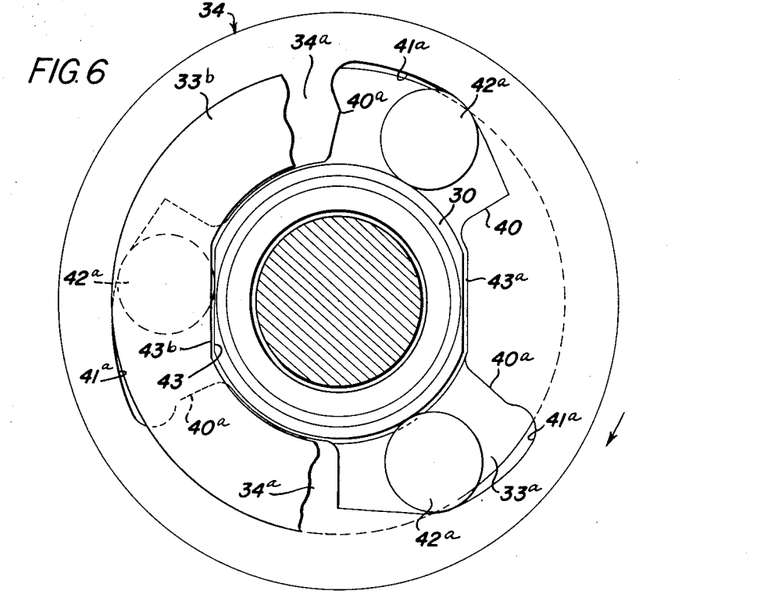
FIG. 6 is a section substantially on line 6—6 of FIG. 5, and with parts broken away.
Figure 7:
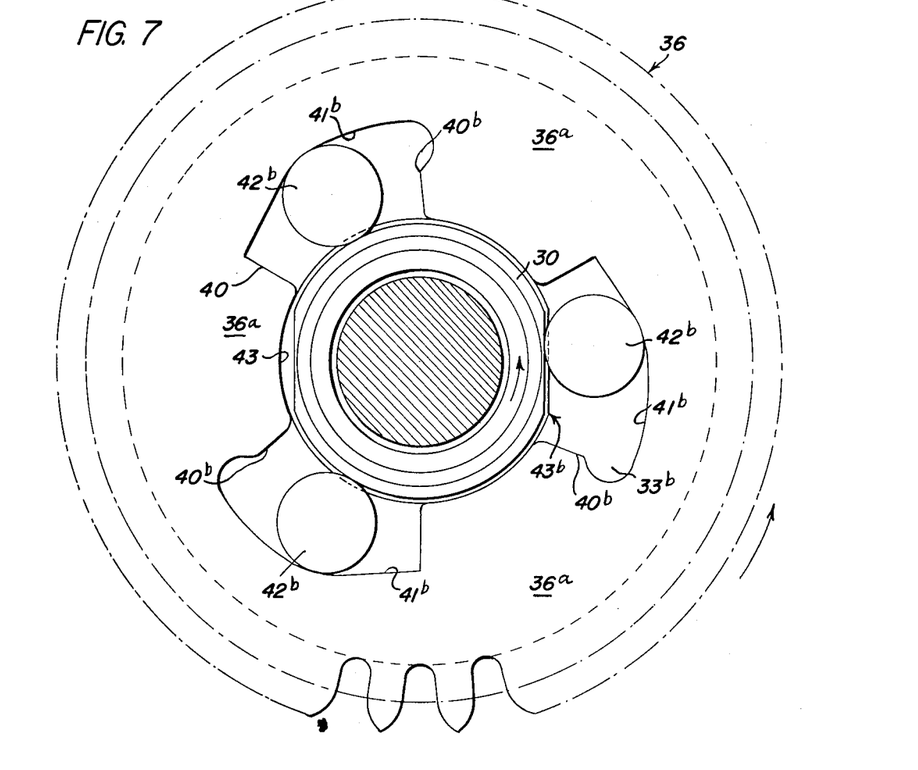
FIG. 7 is a section substantially at line 7—7 of FIG. 5, at the scale of FIG. 6, and with parts broken away.

When the sweep arm 25 moves in a counterclockwise direction, shown by the arrow in FIG. 7, the reverse action occurs. The sleeve 30 and its washers move the rollers 42b into wedging engagement between the sleeve 30 and the upper driving ring 36 so that this upper ring is rotated: while the rollers 42a (FIG. 6) are moved against the radial walls 40a, whereby no driving relation is established to the lower ring 34, and the sleeve 30 and ring 34 can rotate relative to one another.

It will be noted that with two diametrically opposed flat portions 43 on the sleeve 30, and three equi-spaced rollers 42a, 42b in the respective sets, at least two rollers of a set are in driving relation.

Figures 2, 11:
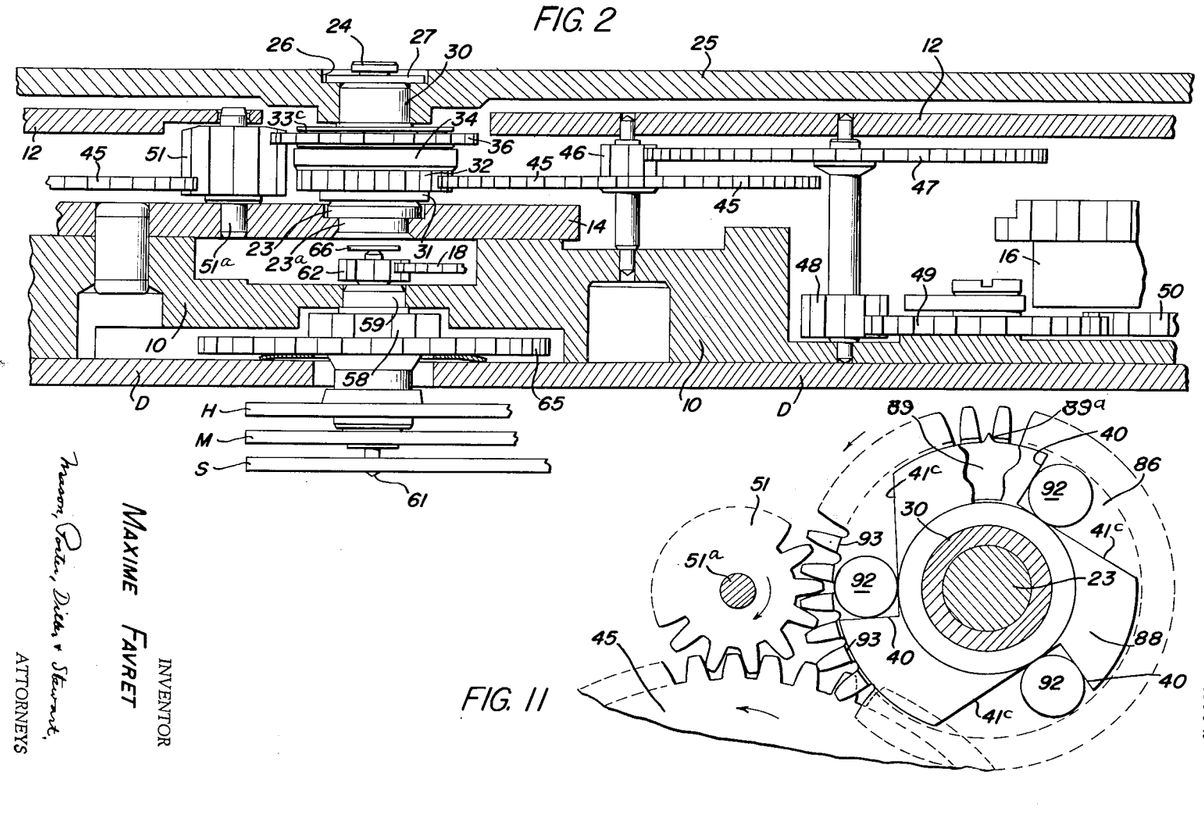
FIG. 2 is a section substantially on the broken line 2—2—2 of FIG. 1, showing parts of the winding system.
FIG. 11 is a section substantially on line 11—11 of FIG. 10.
Figure 3:
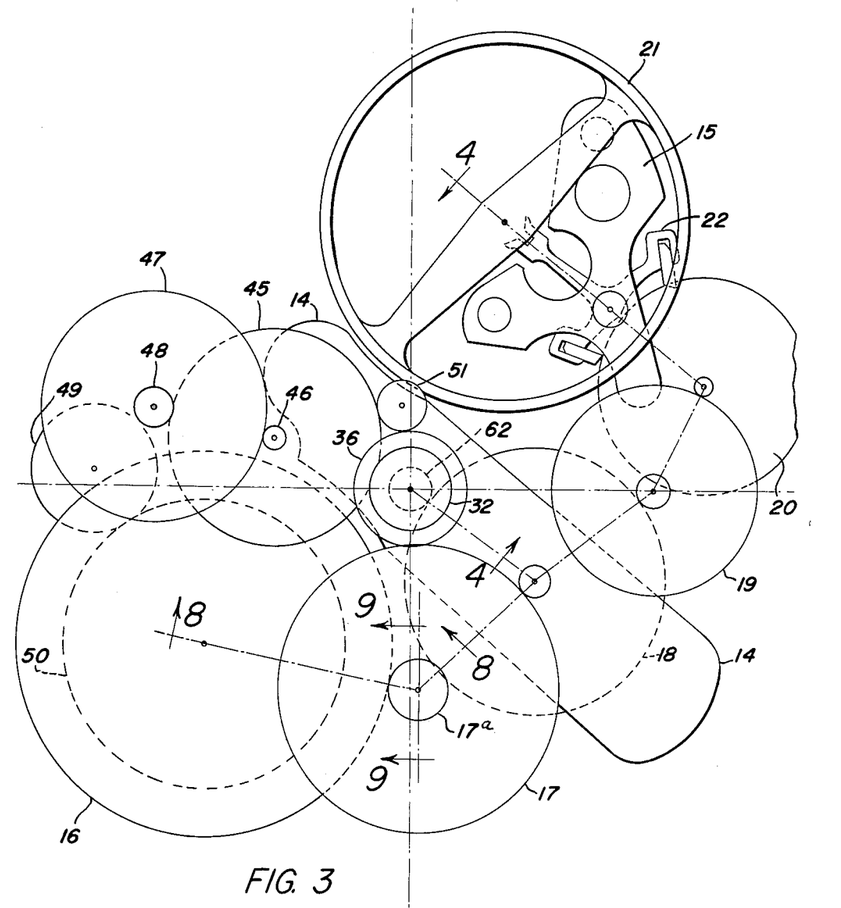
FIG. 3 is a conventionalized diagrammatic view, with parts omitted for clearness of train connections, showing the relative positions of members of the winding and timing trains.

While the sleeve 30 is turning in a clockwise direction in FIG. 6, the toothed ring 32 is driven and this in turn rotates the gear 45 (FIGS. 2 and 5) in a counterclockwise direction (FIG. 3) so that its associated pinion 46 drives the gear 47 whose pinion 48 is in mesh with a gear 49, which drives the gear 50 mounted on the mainspring arbor which is within the spring barrel 16 for a clockwise winding motion of the mainspring. When the sleeve 30 is turning in a counterclockwise direction, the toothed ring 36 is driven, which turns the idler gear 51 in a clockwise direction; this idler 51 is rotatable on a pin 51a of center bridge 14, and in mesh (FIGS. 2, 3 and 5) with the gear 45 and moves the latter in a counterclockwise direction so that through the train 45—46—47—48—49—50 the arbor of the spring barrel 16 receives a clockwise winding movement. In FIGS. 2 and 3, it will be noted that the toothed ring 32 is smaller than the ring 36, and that while ring 32 is in direct driving relation with the gear 45, the ring 36 is free of the gear 45 but is in driving relation therewith through the idler 51.

In this illustrative construction, the bridges (FIGS. 2 and 3) provide a space at the movement center, and the stud 23 is firmly seated adjacent the pillar plate 10, so that a strong and rigid support is provided for the sleeve 30 and the parts thereon, and these parts can be positioned (FIGS. 2 and 3) below the level of the top surface of the barrel and other bridges of the watch movement. Thus, little greater axial space is required for this arrangement than for a corresponding movement without the self-winding feature. In FIG. 3, the gear or wheel 45 is shown as overlying a part of the spring barrel 16, with the associated pinion 46 of gear 45 driving the gear 47 whose pinion 48 is in driving relation to the idler 49 and thus to the spring arbor gear 50, both of the latter being located below the barrel level in FIG. 2. The central bridge 14 is shown (FIG. 4) at the level of the balance wheel 21, and (FIG. 3) this bridge 14 is contoured for the balance wheel motion.

Figure 3A:
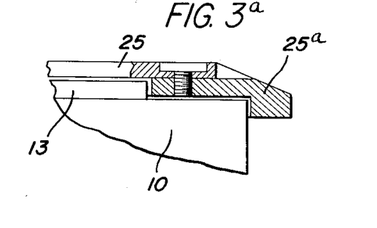
FIG. 3a is a fragmentary section on line 3a—3a of FIG. 1, showing the pendulum construction.
Figure 4:
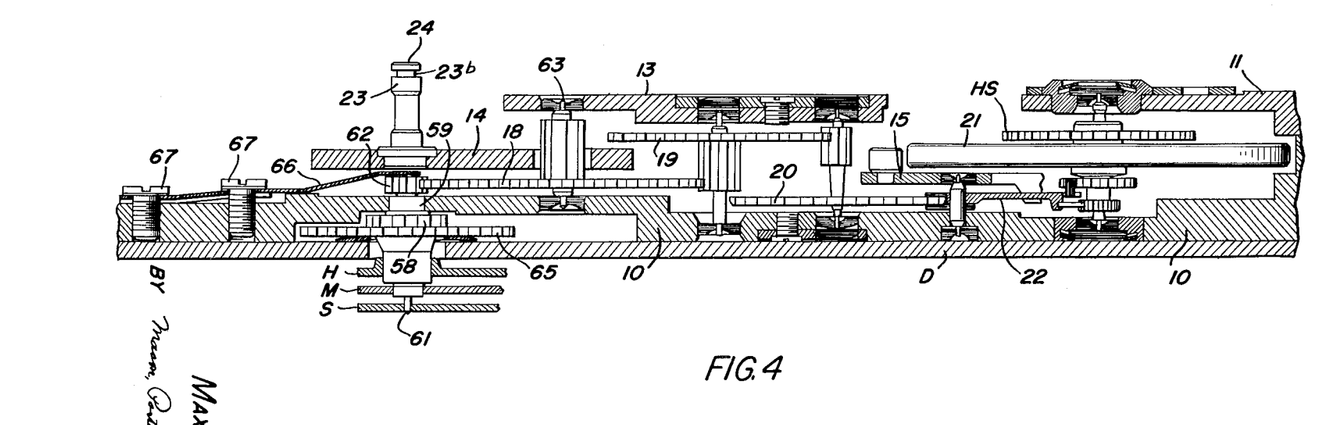
FIG. 4 is a section substantially on broken line 4—4—4 of FIG. 3, to show certain train parts.

The swing arm 25 has the pendulum weight 25a fixed thereon, FIG. 3a; and this weight 25a can swing about the center axis of the stud 23 in either direction and by any revolutions or fractions of a revolution, producing a winding effect upon the spring barrel with each such motion.

Figure 8:
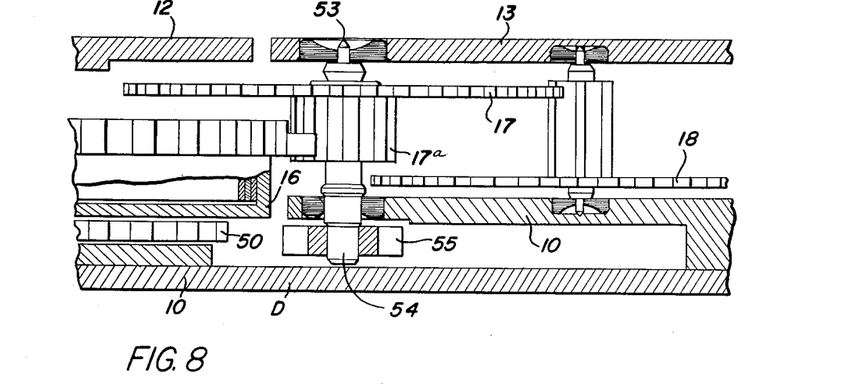
FIG. 8 is a fragmentary section substantially on broken line 8—8 of FIG. 3.
Figure 9:
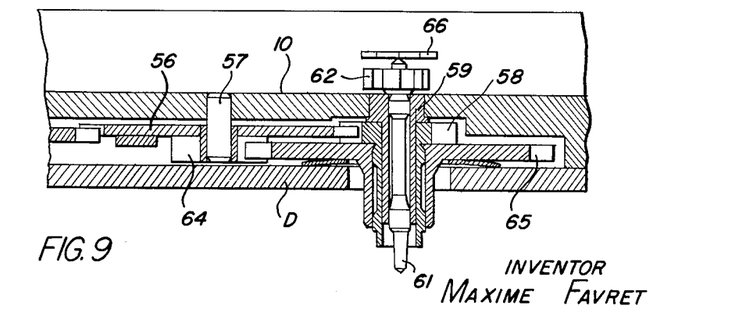
FIG. 9 is a fragmentary section substantially on line 9—9 of FIG. 3.

The gear train (FIG. 3) from the spring barrel 16 to the escapement and balance has the wheels and pinions as above set out; and for compactness, none of these wheels extends past the movement center. Therewith the axis of the second wheel 17 is mounted at a sufficient distance from the movement center so that the wheel 17 can rotate with its staff 53 and pinion 17a without interference by the power transfer parts surrounding the stud 23, e.g. being at the level of the smaller rings 32 and 34; the wheel 17 in part overlies the barrel 16, and the associated pinion 17a is in mesh with the spring barrel teeth. The staff 53 of wheel 17, FIG. 8, is mounted in the train bridge 13 and the pillar plate 10: this staff 53 projects beyond the pillar plate 10 and has a split resiliently spreading end 54 for receiving the gear 55 which is located in a sink at the outer face of the pillar plate 10 and is in mesh with the minutes wheel 56 located in the sink and supported (FIG. 9) by the pin 57 press-fitted in the pillar plate 10. The minutes wheel 56 is in mesh with the cannon pinion 58 on the minutes hand staff. The center bridge plate 14 extends over a sink at the upper or inner face of the pillar plate (FIG. 4) so that there is a space along the movement center axis, between the stud 23 and the pillar plate 10. A peripherally flanged sleeve 59 is press-fitted into the pillar plate 10, coaxially to the movement center, and receives the sweep seconds hand staff 61 having the pinion 62 thereon which is in mesh with the third wheel 18 to be driven thereby. This third wheel 18 is located on its staff 63, close to the pillar plate and beneath the level (FIG. 4) of the lower surface of the center bridge plate 14. The cannon pinion 58 is rotatably mounted on the fixed sleeve 59 and is in mesh with the minutes wheel 56. The hours wheel 65 and its hollow staff is mounted around the sleeve of the cannon pinion 58 and is in mesh with the pinion 64 fixed to the minutes wheel 56 (FIG. 9). The pointed upper or inner end of the sweep seconds staff is spaced from the stud 23, and a blade spring 66 (FIGS. 4 and 9) is held on the plate 10 by the screws 67 and engages the pointed end of the seconds staff for a resilient loading having little retarding effect upon the rotation but urging the staff 61 relatively outwardly (that is, downwardly in FIGS. 2, 4 and 9) for avoiding interference by the sweep second hand S with other hands and also to avoid a vibration of the sweep hand because of the free play between the teeth of the wheel 18 and pinion 62. End shake of the hands H and M, and associated parts, may be limited by a spring washer 69 surrounding the center axis and bearing against the dial and the wheel 65.

When a setting device, conventionalized as the stem 70, FIG. 1, is moved, the minutes wheel 56 and its hollow staff can be rotated as usual for moving the cannon pinion 58 and the hours wheel 65 in the usual way for adjusting the minutes and hours hands M and H to indicate the correct time; movement of the time train and of the seconds hand S being avoided by the slippage of gear 55 on the resiliently engaging end 54 of the staff 53 of wheel 17.

The pendulum and clutch parts may be subassembled upon the sleeve 30 in the illustrative structure. Thus the sleeve 30 may be successively fitted with the toothed ring 32, the washer 33a and the driving ring 34; the rollers 42a are inserted between the sleeve 30 and the ring 34; the washer 33b and the toothed ring 36 are positioned; the rollers 42b are inserted between the ring 36 and the sleeve 30; the washer 33c is positioned; and finally the sweep arm 25 is placed around the sleeve 30 and pressed until it is solidly seated. At this stage, the parts may be tested for proper fitting, noting that the rollers 42a, 42b are held from axial displacement and loss. This sub-assembly may be introduced to and removed from other parts by simply placing over the stud 23 and moving the same axially with respect thereto, rotating the meshing gear parts if required, until the head 24 passes through the larger part of the keyhole slot 28 in the locking piece 27: the piece 27 is then slid until its smaller part is beneath the head 24 and then is secured by the screw 29. The actuator parts of the winding mechanism are thus independent of other parts and have an axially long bearing upon the stud 23 which is fixed to the lower central bridge plate 14 and thus solidly to the pillar plate 10, without strain upon the train bridges and balance cock.

Figures 10, 12:
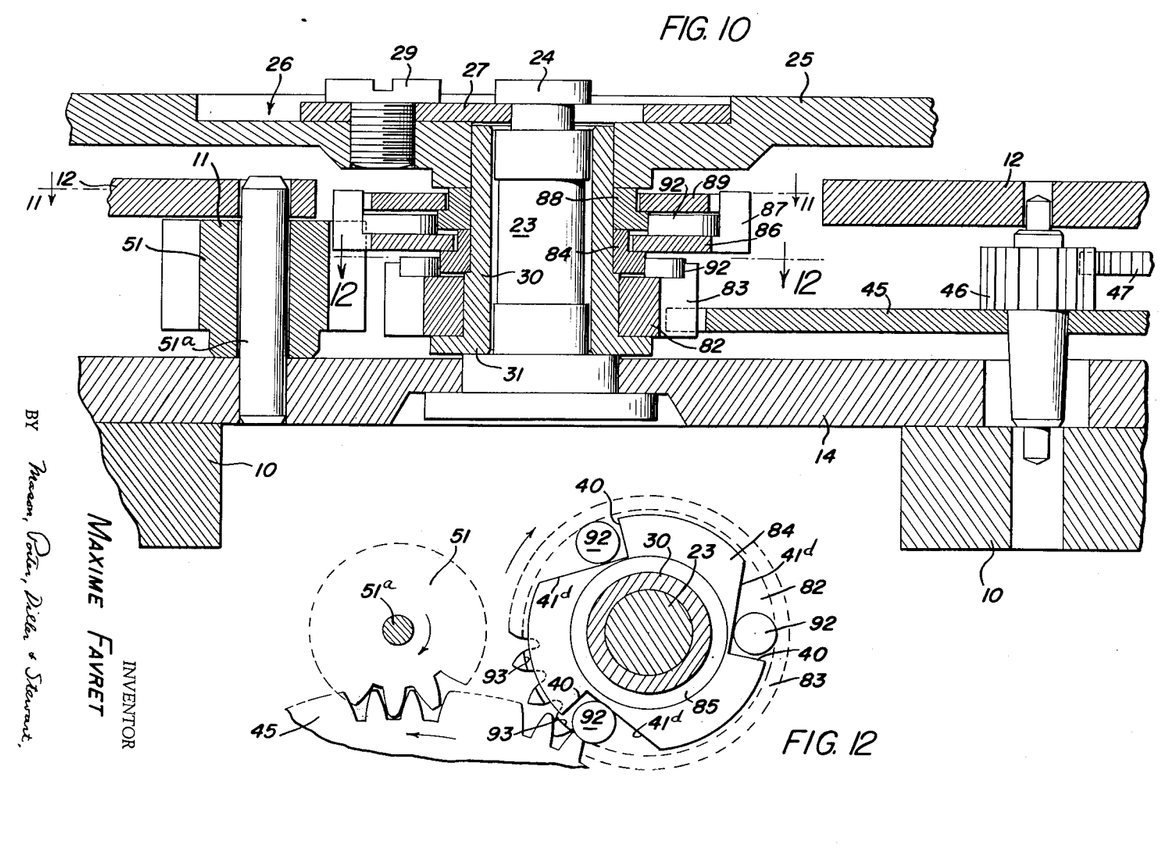
FIG. 10 is a view corresponding to FIG. 5, of a modified construction.
FIG. 12 is a section substantially on line 12—12 of FIG. 10.

In the modified construction of FIGS. 10 to 12, a sleeve 30 is freely rotatable about the body of the stud 23 and has a lower flange 31 against which rotatably rests the toothed lower ring 82. A first driving ring 84 is tightly fitted on the sleeve 30 to move therewith: this ring 84 fits loosely within an axially projecting peripheral portion 83 of the lower ring 82 and has a reduced axial flange 85 for rotatably receiving the rotatable toothed upper ring 86 which has an axially projecting peripheral portion 87. A second driving ring 88 is tightly fitted on the sleeve 30, noting that the two driving rings 84, 88 can be pressed together and their assembly engaged with a shoulder on the sleeve 30 for determining their axial positions relative to the flange 31 of the sleeve 30. The sweep or pendulum arm 25 has a central aperture which likewise closely fits the sleeve 30, so that the parts 25, 30, 84, 88 turn together. The upper driving ring 88 is shown with a reduced axial flange for receiving a washer 89.

Each of the driving rings 84, 88 has notches in its periphery, for example three in number, as illustrated in FIGS. 11 and 12. These notches have radial end walls 40 and chordal walls 41c, 41d, and receive the rollers 92 which have their axes parallel to the axis of the sleeve 30. As in the first form of construction, the walls 41c, 41d are oppositely pitched from the radial walls 40, FIGS. 11 and 12. In the illustrative form, the teeth of the rings 82, 86 are deeper than the radial dimension of the respective projections 83, 87 so that the inner surfaces 93 of the projections 83, 87 are formed by the teeth, with peripheral spacings or gaps. The washer 89 can have triangular projections 89a for loose engagement in tooth gaps, so that the washer tends to move with the upper toothed ring 86 while rotating about the driving ring 88. When the rollers 92 rest against the radial walls 40 they are free of the toothed rings, and the respective parts can perform relative motions. As each driving ring 84 or 88 is rotated with the sleeve 30, its chordal walls 41c or 41d move the rollers 92 outward so that they wedgingly engage the surfaces 93, and cause the respective gear 82 or 86 to be turned in the same direction. In FIG. 11, the gear 86 is thus driven upon counterclockwise movement of the ring 88 and sleeve 30; and in FIG. 12, the gear 82 is driven upon clockwise movement of the ring 83 and sleeve 30. Thus, depending upon the direction of movement of the sleeve 30, either the toothed ring or gear 86 or the toothed ring or gear 82 is driven. The presence of peripheral gaps between the surfaces 93 permits the rollers to move radially inward toward the axis of the stud 23 and the sleeve 30 and thus enter respective gaps, so that the driving effort is increased and is not dependent merely upon friction effects between the rollers 92 and the surfaces 93 which are concentric with the stud axis. When the sleeve 30 is turning opposite to the driving direction for either ring 84 or 88, the chordal walls 41c, 41d travel relative to the rollers 92, and permit these rollers to disengage from surfaces 93 and the gaps therebetween.

When the sleeve 30 is being driven counterclockwise by the arm 25, and thus acting through ring 88 and rollers 92 to move the gear 86, this gear 86 drives the idler 51, and thus moves the gear 45 and other parts of the winding train as before. When the sleeve 30 is being driven clockwise, the gear 82 is driven, and therewith the gear 45 is directly driven in the same direction as before.

The structures shown are illustrative, and the invention can be employed in many forms within the scope of the appended claims.

What is claimed is:

1. A self-winding watch having a pillar plate and a stud mounted thereon, a sleeve rotatable about the stud and having a radial flange at one end and non-round outer peripheral portions between its ends, a first driven ring surrounding the sleeve and supported by the radial flange, a first washer surrounding the sleeve, said first driven ring having notches on its inner periphery, first rollers in said notches of the first ring and resting on said first washer and being thicker than said first ring, a second washer surrounding the sleeve and resting on said first rollers, said washers having their inner peripheries conformed to said outer portions of the sleeve so that the sleeve and washers turn together, a second driven ring surrounding the sleeve and resting on said second washer, said driven rings being individually free to rotate relative to the sleeve, said second driven ring having notches on its inner periphery, second rollers in the notches of the second ring and resting on said second washer and being thicker than said second ring, said notches having spiral walls with the spiral walls of the two rings being oppositely directed, and an end washer surrounding the sleeve and resting on the second rollers.

2. A watch as in claim 1, in which the first driven ring has first gear teeth connected therewith, the second driven ring has second gear teeth connected therewith, said first gear teeth being of smaller diameter than said second gear teeth, a driven gear in mesh with said second gear teeth, an idler gear in mesh with said first gear teeth and said driven gear.

3. A self-winding watch having a pillar plate, barrel and train bridges secured to the pillar plate and having their lower surfaces spaced therefrom, time train parts located in the space between the pillar plate and bridges and supported thereby and including a mainspring and spring barrel and a hand staff, said bridges and time train parts being radially spaced from the hand staff axis, a stud connected to the pillar plate and extending along the hand staff axis within the space between the bridges and time train parts, a sleeve rotatable on said stud and extending above the said bridges, a pendulum fixed to said sleeve for rotating the same and located above said bridges, over-running clutch means cooperative with said sleeve and located about said axis below the level of said bridges, said clutch means being formed with gear teeth, and a driving gear in mesh with said gear teeth for winding said mainspring, said clutch means being effective to rotate said driving gear when the sleeve is rotated in one direction and to free said driving gear when the sleeve is rotated in the other direction.

4. A self-winding watch having a pillar plate, bridge means mounted on the pillar plate and above the same, winding and time train parts journaled in and located between the pillar plate and bridge means, indicating means including staffs mounted on the pillar plate, hands on said staffs located below the pillar plate, a mainspring located between the pillar plate and bridge means and supported therefrom for winding by said winding train parts, and a pendulum located above the bridge means, the combination therewith of a center bridge mounted on the pillar plate at a level below the bridge means, said center bridge having a part at the axis of said staffs which is spaced from the pillar plate, a gear member on a said staff and located in the space between the pillar plate and center bridge, a stud fixed in the center bridge and extending upwardly therefrom along the staff axis to a point above the bridge means, a sleeve rotatable on said stud and fixedly connected at its upper end to said pendulum, over-running clutch means surrounding the sleeve, said bridge means and train parts and mainspring being spaced radially from said sleeve and over-running clutch means, said sleeve and clutch means being insertable upon the stud by movement axially therealong into the said radial space, means at the upper end of the stud for preventing axial separating movement of the sleeve and clutch means, said clutch means having gear teeth for engaging a winding train part, and said time train parts including a gear in mesh with said gear member.

References Cited in the file of this patent

UNITED STATES PATENTS

| | | |
|---|---|---|
| 1,375,576 | Duca | Apr. 19, 1921 |
| 1,465,486 | Sandiford | Aug. 21, 1923 |
| 2,029,559 | Colomb | Feb. 4, 1936 |
| 2,063,799 | Fornelius | Dec. 8, 1936 |
| 2,574,343 | Meyer | Nov. 6, 1951 |
| 2,685,164 | Grillet | Aug. 3, 1954 |
| 2,749,779 | Godat | June 12, 1956 |
| 2,756,559 | Derr | July 31, 1956 |
| 2,867,971 | Bertsch et al. | Jan. 13, 1959 |

FOREIGN PATENTS

| | | |
|---|---|---|
| 292,134 | Switzerland | Oct. 16, 1953 |
| 902,835 | Germany | Jan. 28, 1954 |
| 904,280 | Germany | Feb. 18, 1954 |
| 1,081,532 | France | June 9, 1954 |